Nov. 24, 1970

R. D. HANSON 3,541,732

VEHICLE WINDOW ADJUSTING MEANS

Filed April 11, 1969

INVENTOR.
Richard D. Hanson
BY
D. L. Ellis
ATTORNEY

Nov. 24, 1970    R. D. HANSON    3,541,732
VEHICLE WINDOW ADJUSTING MEANS
Filed April 11, 1969    2 Sheets-Sheet 2
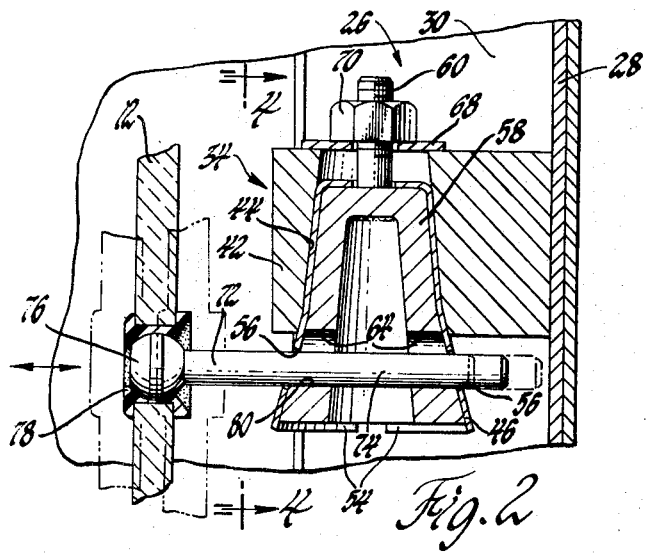
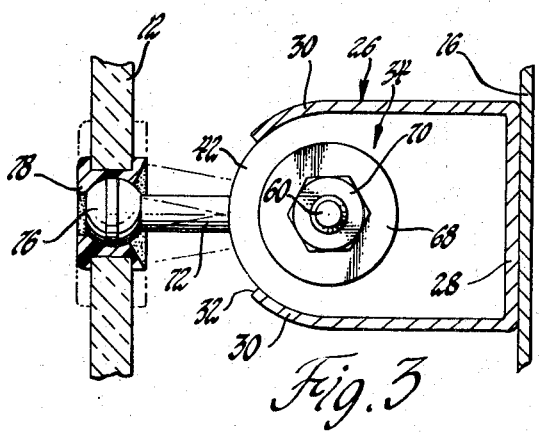
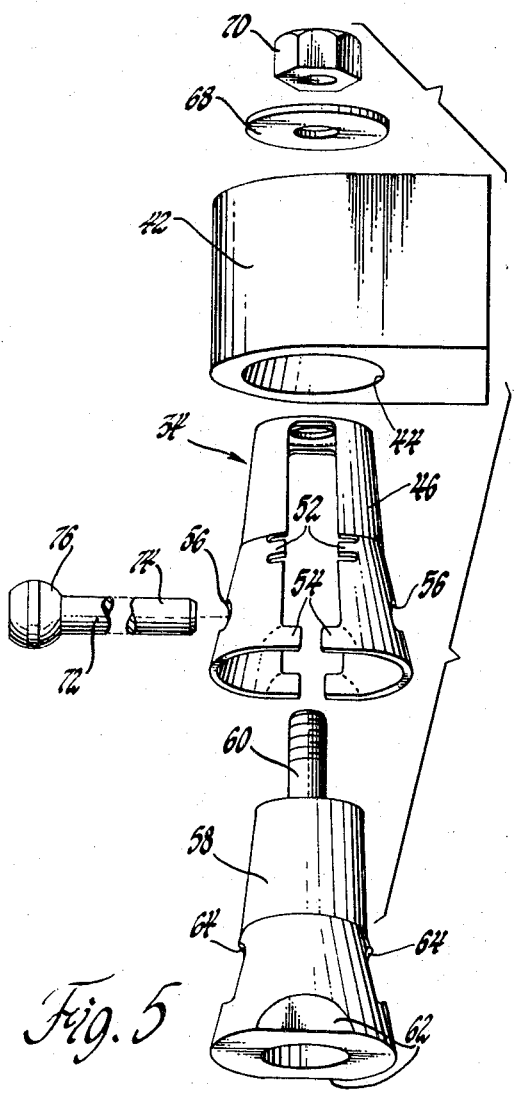
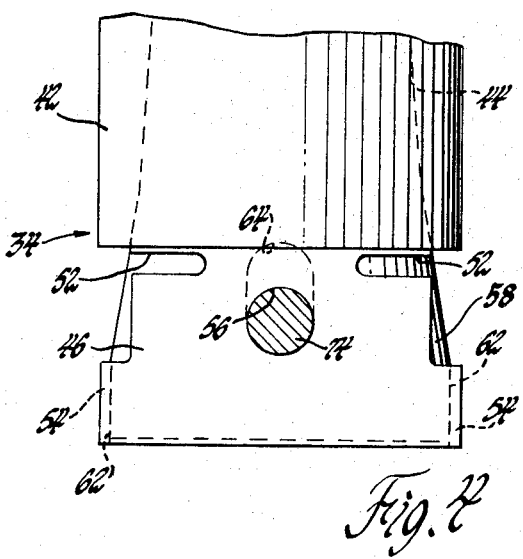
INVENTOR.
Richard D. Hanson
BY
D. L. Ellis
ATTORNEY United States Patent Office 3,541,732
Patented Nov. 24, 1970

3,541,732
VEHICLE WINDOW ADJUSTING MEANS
Richard D. Hanson, Detroit, Mich., assignor to General Motors Corporation, Detroit, Mich., a corporation of Delaware
Filed Apr. 11, 1969, Ser. No. 815,468
Int. Cl. E05d *15/16*
U.S. Cl. 49—440                                    4 Claims

ABSTRACT OF THE DISCLOSURE

A side drop window assembly for vehicle bodies includes a window panel movable relative to a window opening in the vehicle body and guided throughout its movement by a combined panel guide and path adjustment apparatus including a guide track fixed to the vehicle body. The guide and adjustment apparatus further includes a guided member slidable in the fixed track and carrying a pivot member which in turn carries a panel mounting member attached to the panel, the pivot member being rotatable about one axis of the guide member for fore and aft adjustment of the panel and the panel mounting member being shiftable along another axis for lateral adjustment of the panel in the body.

---

This invention relates generally to vehicle body windows and more particularly to means for adjusting the guided path of a movable window panel relative to the vehicle body.

The primary feature of this invention is that it provides new and improved means for adjusting the guided path of a movable window panel in the vehicle body to achieve a suitable working relation between the window panel and the vehicle body. Another feature of this invention is that it provides new and simplified vehicle body window panel guide path and adjustment means including a window guide track fixed to the vehicle body and window panel mounting means connecting the window panel and the guide track and operative for selective adjustment of the window panel relative to the fixed guide track. A further feature of this invention is that it provides window panel guide and path adjustment means particularly including a guided member movably mounted in the guide track having rotatably mounted thereon a pivot member which in turn carries a mounting member attached to the window panel and movable in the pivot member so that selected rotation of the pivot member adjusts the window panel relative to the fixed guide track in one direction, while selected bodily shiftable movement of the mounting member adjusts the window panel relative to the guide track in another direction. Still another feature of this invention is in the provision of a simplified window adjustment maintenance arrangement whereby a single tightening operation locks the panel guide and path adjustment means in both directions of adjustment. These and other features of the invention will be readily apparent from the following specification and drawings wherein:

FIG. 2 is an enlarged sectional view taken generally along the plane indicated by lines 2—2 of FIG. 1;

FIG. 3 is an enlarged sectional view taken generally along the plane indicated by lines 3—3 of FIG. 1;

FIG. 4 is an enlarged sectional view taken generally along the plane indicated by line 4—4 of FIG. 2; and FIG. 5 is an exploded perspective view.

Figure 1:
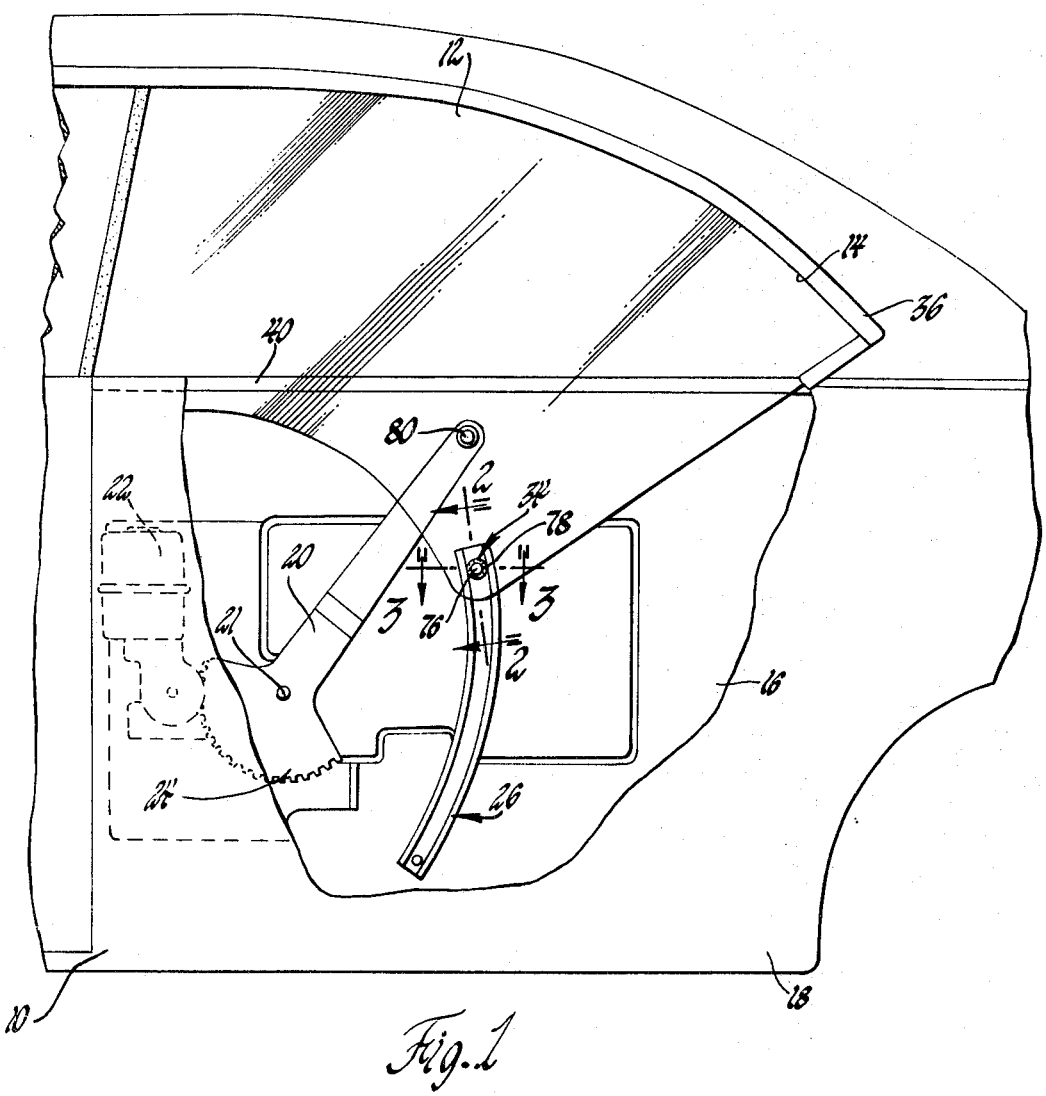
FIG. 1 is a fragmentary elevational view of a vehicle body including movable window panel and panel guide and path adjustment means according to this invention.

Referring now to FIG. 1 of the drawings, there is shown at rear quarter portion of a hard top coupe style vehicle body 10 having a side drop glass window panel 12 mounted therein for movement between a raised position as shown and a lowered position, not shown, relative to a rear quarter window opening 14. As is conventional, the window panel 12 in its lowered position rests in a window well defined by spaced inner panel and outer panel structures of the body designated 16 and 18 respectively. Window panel 12 is movable between its positions by any suitable form of window regulator apparatus, such as that shown, which includes a single lift arm 20 pivotally mounted at 21 on inner panel 16 and attached at its distal end directly to the window panel 12. The lift arm is selectively rotatable in either direction for window panel movement by a reversible electric motor unit indicated at 22 connected to gearing means including a sector 24 of the lift arm.

In description now of the window panel guide and path adjustment means of the invention, it includes a guide track 26 bolted or otherwise suitably fixed to the inner panel 16. The guide track is of curved configuration meeting certain general motion path requirements peculiar to the environment of window opening 14 and lift arm 20. As best shown in FIG. 3, and for reasons appearing hereinafter, guide track 26 is generally of a channel shape having a flat web 28 and flanges 30 which curve inwardly to form a channel mouth 32 narrower than web 28. Movably mounted within guide track 26 is the guided portion of the panel guide and path adjustment apparatus, generally designated at 34, providing connection between window panel 12 and guide track 26. In accordance with the invention, guided portion 34 not only cooperates with the guide track to define the general motion path of the window panel, but is also functional for limited adjustment of window panel 12, generally in the plane thereof, in a fore and aft direction relative to the vehicle body 10 for proper sealing fit in opening 14 through engagement with vehicle weather seals as at 36. Further, it allows for limited adjustment of window panel 12 in a lateral direction relative to the vehicle body to obtain needed clearance from interior body hardware or to establish proper lateral sealing engagement with weather seals 40 located at the body belt line adjacent opening 14.

Referring more particularly now to FIGS. 2, 3 and 5, guided portion 34 includes a guided member 42 shaped in cross section for close sliding fit in guide track 26. Member 42 has a tapered bore 44 which rotatably receives a frusto-conically shaped split sleeve 46 open at its large diameter end. For purposes appearing later, split sleeve 46 includes diametrically opposed pairs of outwardly bent tangs 52, similar inwardly bent tangs 54, and a pair of aligned circular apertures 56. In turn received within the sleeve is a generally frusto-conically shaped hollow pivot member 58 having a threaded stud 60 extending through a central aperture in the small diameter end of split sleeve 46. A pair of locking flats 62 on the large end of the pivot member cooperate with the tangs 54 on the split sleeve for preventing relative rotation between the pivot member 58 and the split sleeve 46. Aligned generally slot-like apertures 64 in the pivot member 58 are registered with the apertures 56 in the sleeve, as best seen in FIGS. 2 and 4. Stud 60 receives a washer 68 bearing on the upper surface of guided member 42 and a nut 70 is threaded onto stud 60 to retain pivot member 58 and split sleeve 46 wedgingly within tapered bore 44.

Mounted in pivot member 58 and split sleeve 46 through the registered slot-like apertures 64 and apertures 56 respectively is the cylindrical shank 74 of a mounting member 72. A generally spherical attaching portion 76 of the mounting member is firmly received within the socket of a grommet 78 of plastic or like construction anchored within an aperture in the window panel 12. With the window panel being mounted thusly on the guided portion 34, the ball and socket connection provided by mounting member 72 and grommet 78 affords whatever limited universal movement between the mounting member and window panel 12 that is required during movement of the panel or during the path adjustment operation thereon now to be described.

The procedure for window path adjustment is as follows: window panel 12 is placed in the window well of the vehicle body 10 between inner panel 16 and outer panel 18 and is attached suitably to regulator lift arm 20 at 80 and to guided portion 34 in guide track 26 via the grommet 78. Regulator lift arm 20 is then actuated to bring window panel 12 up to its generally closed position. The operator then visually determines the fore and aft and/or lateral adjustment of window panel 12 relative to vehicle body 10 that is required to bring window panel 12 into proper working relation with weather seals 36 and 40 and the interior body hardware. If any such adjustment is required, nut 70 on stud 60 is loosened allowing pivot member 58 to rotate in guided member 42 and mounting member 72 to shift laterally in pivot member 58. Rotation of pivot member 58 provides the required fore and aft adjustment of window panel 12 relative to the vehicle body 10, and shifting movement of mounting member 72 relative to pivot member 58 provides the required lateral adjustment of window panel 12 relative to the vehicle body 10.

Once the required adjustment of window panel 12 is achieved, it is maintained merely by tightening nut 70 on stud 60. Initially, tightening of nut 70 on stud 60 slidably draws pivot member 58 into split sleeve 46 thereby expanding the latter. The expansion causes substantial wedging engagement at the edges of apertures 56 of split sleeve 46 and shank portion 74 of mounting member 72 to prevent bodily shiftable movement of mounting member 72 relative to split sleeve 46. Further drawing up of the pivot member brings the bottoms 80 of slot-like apertures 64 up into contact with shank portion 74 of the mounting member, providing positive holding of the latter between the pivot member and the split sleeve. Concurrently, or with added tightening of nut 70, both pivot member 58 and split sleeve 46 are drawn up into tapered bore 44 to wedge the split sleeve between the tapered bore and the pivot member. This surface wedging, together with the resulting forced spreading of tangs 54 to bite into the surface of bore 44, prevents rotation of split sleeve 46 relative to guide member 42 and thus also any rotation of pivot member 58 and mounting member 74 relative thereto. The selected adjustment is thus maintained, and any readjustment of course requires only a loosening of nut 70 and a repeat of the described procedure.

Having thus described the invention, what is claimed is:

1. In a vehicle body window assembly including a window panel movable between open and closed positions relative to a body opening and guide track means fixed to the vehicle body for guiding movement of said panel between said positions thereof, adjustable window mounting means comprising, guided means mounted within said guide track means and defining a first axis for adjustment of said panel generally in the plane thereof fore and aft relative to the body opening and said guide track means and a second axis for adjustment of said panel laterally of the body opening toward and away from said guide track means, and a mounting member attached to said panel and mounted to said guided means for selective rotation about said first axis for adjustment of said panel fore and aft relative to said body opening and for bodily shiftable movement along said second axis for adjustment of said window laterally of said body opening.

2. In a vehicle body window assembly including a window panel movable between open and closed positions relative to a body opening and guide track means fixed to the vehicle body for guiding movement of said panel between said positions thereof, adjustable window mounting means comprising, a guided member movably mounted within said guide track means, a pivot member mounted on said guided member for rotation about a first axis defined thereby, and a panel mounting member attached to said panel and mounted on said pivot member for bodily shiftable movement along a second axis defined by the latter generally perpendicular to said first axis, said pivot member and said mounting member being selectively rotatable as a unit about said first axis of said guided member to positionally adjust said panel relative to said guide track means in one direction and said mounting member being selectively bodily shiftable along said second axis of said pivot member to positionally adjust said panel relative to said guide track means in another direction.

3. The adjustable window mounting means as described in claim 2 further including means for selectively locking said pivot member against rotation about said first axis and means for selectively locking said mounting member against bodily shiftable movement along said second axis.

4. In a vehicle body window assembly including a window panel movable between open and closed positions relative to a body opening and guide track means fixed to the vehicle body for guiding movement of said panel between said positions thereof, adjustable window mounting means comprising, a guided member movably mounted within said guide track means, said guided member having a tapered bore therethrough the axis of which defines a first axis of window adjustment relative to the vehicle body, a frusto-conically shaped split sleeve rotatably and slidably mounted in said tapered bore, a frusto-conically shaped pivot member slidably mounted in said split sleeve, said split sleeve and said pivot member having aligned apertures situated along an axis perpendicular to said first axis and defining a second axis of window adjustment relative to the vehicle body, a mounting member slidably mounted in said aligned apertures in said split sleeve and said pivot member and having a distal end thereof attached to said window panel, said split sleeve, said pivot member and said mounting member being selectively rotatable as a unit relative to said guided member about said first axis for adjustment of said window panel in a first direction, said mounting member being bodily slidable relative to said split sleeve and said pivot member along said second axis for adjustment of said window panel in a second direction, means on said guided member and said pivot member operative for selective wedging displacement of the latter within said split sleeve along said first axis, and means on said split sleeve operative under said wedging displacement of said pivot member to lockingly engage said pivot member against rotation relative to said guided member about said first axis and lockingly engage said mounting member against bodily slidable movement relative to said guided member along said second axis.

References Cited
UNITED STATES PATENTS

| | | | |
|---|---|---|---|
| 3,216,759 | 11/1965 | Williams | 59—227 X |
| 3,400,489 | 9/1968 | Stenger et al. | 49—360 X |
| 3,466,802 | 9/1969 | Doveinis et al. | 49—440 X |

J. KARL BELL, Primary Examiner

U.S. Cl. X.R.

49—227, 348, 363